US010867267B1

(12) United States Patent
Navaratna et al.

(10) Patent No.: US 10,867,267 B1
(45) Date of Patent: Dec. 15, 2020

(54) CUSTOMER CHURN RISK ENGINE FOR A CO-LOCATION FACILITY

(71) Applicant: Equinix, Inc., Redwood City, CA (US)

(72) Inventors: Mohan Navaratna, San Jose, CA (US); Parveen Kumar, Fremont, CA (US); Jaganathan Jeyapaul, San Jose, CA (US); Brian J. Lillie, Los Altos, CA (US)

(73) Assignee: EQUINIX, INC., Redwood City, CA (US)

( * ) Notice: Subject to any disclaimer, the term of this patent is extended or adjusted under 35 U.S.C. 154(b) by 933 days.

(21) Appl. No.: 15/011,104

(22) Filed: Jan. 29, 2016

Related U.S. Application Data

(60) Provisional application No. 62/277,676, filed on Jan. 12, 2016.

(51) Int. Cl.
*G06Q 10/06* (2012.01)
*G06F 16/951* (2019.01)

(52) U.S. Cl.
CPC ....... *G06Q 10/0635* (2013.01); *G06F 16/951* (2019.01)

(58) Field of Classification Search
CPC .................................................. G06Q 10/0635
See application file for complete search history.

(56) References Cited

U.S. PATENT DOCUMENTS

| | | | |
|---|---|---|---|
| 8,069,079 B1 | 11/2011 | Teal et al. | |
| 8,537,845 B2 | 9/2013 | Waldrop et al. | |
| 8,615,419 B2 | 12/2013 | Eilam et al. | |
| 8,630,892 B2 | 1/2014 | Bhalla et al. | |
| 8,639,549 B2 | 1/2014 | Pathak et al. | |
| 8,712,828 B2 | 4/2014 | Maga et al. | |
| 9,065,872 B1 | 6/2015 | Duarte et al. | |
| 9,576,048 B2 | 2/2017 | Akolkar et al. | |
| 2003/0200135 A1 | 10/2003 | Wright | |
| 2006/0143027 A1* | 6/2006 | Jagannathan | ...... G06Q 10/0637 705/7.36 |
| 2007/0185867 A1 | 8/2007 | Maga et al. | |

(Continued)

OTHER PUBLICATIONS

Scott A. Neslin et al, Defection Detection: Measuring and Understanding the Predictive Accuracy of Customer Churn Models, Journal of Marketing Research vol. XLIII (May 2006), 204-211 (Year: 2006).*

(Continued)

*Primary Examiner* — Andre D Boyce
(74) *Attorney, Agent, or Firm* — Shumaker & Sieffert, P.A.

(57) ABSTRACT

In some examples, a customer churn risk engine is configured to query at least one of co-location data indicating co-location facility usage by a particular co-location facility customer and telemetry data indicating interconnections established between the particular co-location facility customer and at least one additional co-location facility customer within at least one co-location facility operated by a co-location facility provider. The customer churn risk engine is further configured to generate, based at least in part on at least one of the co-location data and the telemetry data, a churn risk score for the particular co-location facility customer. The customer churn risk engine is configured to output the churn risk score for the particular co-location facility customer.

21 Claims, 6 Drawing Sheets

(56) References Cited

U.S. PATENT DOCUMENTS

| | | | | |
|---|---|---|---|---|
| 2008/0208654 | A1* | 8/2008 | Nahikian | G06Q 10/06 705/7.22 |
| 2009/0106064 | A1* | 4/2009 | Egner | G06Q 10/063 705/7.12 |
| 2010/0125473 | A1 | 5/2010 | Tung et al. | |
| 2011/0086611 | A1* | 4/2011 | Klein | H04M 15/00 455/407 |
| 2011/0106579 | A1* | 5/2011 | Nair | G06Q 30/02 705/7.28 |
| 2011/0137805 | A1 | 6/2011 | Brookbanks et al. | |
| 2011/0178831 | A1* | 7/2011 | Ravichandran | G06Q 10/06 705/7.11 |
| 2011/0270968 | A1 | 11/2011 | Salsburg et al. | |
| 2012/0053990 | A1 | 3/2012 | Pereg et al. | |
| 2012/0095841 | A1* | 4/2012 | Luckerman | G06Q 30/04 705/14.66 |
| 2013/0003538 | A1* | 1/2013 | Greenberg | H04L 47/623 370/230 |
| 2013/0013442 | A1* | 1/2013 | Waldrop | G06Q 30/0611 705/26.4 |
| 2013/0211873 | A1* | 8/2013 | Varadarajan | G06Q 50/01 705/7.28 |
| 2013/0279672 | A1* | 10/2013 | Mohan | G06Q 10/0635 379/133 |
| 2013/0282897 | A1 | 10/2013 | Siegel et al. | |
| 2015/0172193 | A1* | 6/2015 | Sinha | H04L 47/12 370/230 |
| 2015/0371163 | A1* | 12/2015 | Noh | G06Q 10/0635 705/7.28 |
| 2016/0080275 | A1* | 3/2016 | Kumaresh | H04L 43/062 709/224 |
| 2016/0203509 | A1* | 7/2016 | Sharp, III | G06Q 30/0244 705/14.43 |
| 2017/0012831 | A1 | 1/2017 | Felbinger et al. | |
| 2017/0061343 | A1* | 3/2017 | Han | G06Q 10/0635 |
| 2017/0061344 | A1* | 3/2017 | Han | G06Q 10/0635 |

OTHER PUBLICATIONS

Yu Zhao et al, Customer Churn Prediction Using Improved One-Class Support Vector Machine, ADMA, LNAI 3584, pp. 300-306, 2005 (Year: 2005).*

Palupi D. Kusuma et al, Combining Customer Attribute and Social Network Mining for Prepaid Mobile Churn Prediction, Proceedings of BENELEARN 2013 (Year: 2013).*

U.S. Appl. No. 15/099,407, filed by Juxiang Teng, filed Apr. 14, 2016.

U.S. Appl. No. 62/277,676, filed by Parveen Kumar, filed Jan. 12, 2016.

U.S. Appl. No. 15/001,766, filed by Ravindra JN Rao, filed Jan. 20, 2016.

Mihalcea, et al., "TextRank: Bringing Order into Texts," Jul. 2004, UNT Scholarly Works, 8 pp.

Lawyer, "Understanding the influence of all nodes in a network," Scientific Reports, published Mar. 2, 2015, 9 pp.

"Interconnection 101," 451 Research, Aug. 2015, 40 pp.

"Are Your Digital Assets Mission-Critical?", accessed on Oct. 13, 2015, www.equinix.com, 4 pp.

Lawyer, et al., "Understanding the spreading power of all nodes in a network: a continuous-time perspective," Jun. 12, 2014, PNAS, 16 pp.

"How Do You Maximize the Value of Your Digital Assets?," Interconnection, accessed on Oct. 13, 2015, www.equinix.com, 4 pp.

"Equinix Customer Success Story," Marketing Services, accessed on Oct. 13, 2015, www.equinix.com, 4 pp.

Amendment in Response to Office Action dated Jan. 11, 2019, from U.S. Appl. No. 15/179,645, filed Apr. 9, 2019, 13 pp.

Office Action from U.S. Appl. No. 15/179,645, dated Jan. 11, 2019, 9 pp.

Notice of Allowance issued in U.S. Appl. No. 15/179,645 dated Jul. 29, 2019, 14 pp.

* cited by examiner

CUSTOMER CHURN RISK ANALYSIS USER INTERFACE
750

| CUSTOMER LIST 752 | INTERCONNECTIVITY SCORES 754 | CHURN IMPACT LIST 756 |

DETAILED CUSTOMER CHURN RISK REPORT 760

| | CHURN RISK SCORE | CHURN IMPACT | CHURN REASONS |
|---|---|---|---|
| CUSTOMER 1 764A | CHURN RISK SCORE 766A | CHURN IMPACT 768A | CHURN REASONS 770A |
| CUSTOMER 2 764B | CHURN RISK SCORE 766B | CHURN IMPACT 768B | CHURN REASONS 770B |
| CUSTOMER 3 764C | CHURN RISK SCORE 766C | CHURN IMPACT 768C | CHURN REASONS 770C |
| CUSTOMER 4 764D | CHURN RISK SCORE 766D | CHURN IMPACT 768D | CHURN REASONS 770D |
| CUSTOMER 5 764E | CHURN RISK SCORE 766E | CHURN IMPACT 768E | CHURN REASONS 770E |
| CUSTOMER 6 764F | CHURN RISK SCORE 766F | CHURN IMPACT 768F | CHURN REASONS 770F |

FIG. 5

CUSTOMER CHURN RISK ENGINE FOR A CO-LOCATION FACILITY

PRIORITY CLAIM

This application claims the benefit of U.S. Provisional Application No. 62/277,676 filed Jan. 12, 2016, the entire content of which is incorporated herein by reference.

TECHNICAL FIELD

The invention relates to computer networks and, more specifically, to a co-location facility for interconnecting customers of the co-location facility provider.

BACKGROUND

A co-location facility provider (a "provider") may employ a communication facility, such as a data center or warehouse, in which multiple customers of the provider locate network, server, and storage gear and interconnect to a variety of telecommunications, cloud, and other network service provider(s) with a minimum of cost and complexity. Such co-location facilities may be shared by the multiple customers. By using co-location facilities of the provider, customers of the provider including telecommunications providers, Internet Service Providers (ISPs), application service providers, service providers, content providers, and other providers, as well as enterprises, enjoy less latency and the freedom to focus on their core business.

Customers co-located at a co-location facility typically lease space or storage capacity for a set duration. During any period of time, a customer may discontinue its relationship with the provider and remove its equipment or data from the communication facility. For a provider, the loss of a customer means loss of revenue and finding a new tenant for the vacant space.

SUMMARY

In general, techniques of the disclosure are directed to predicting a likelihood that a customer will discontinue or reduce an amount of services obtained from a co-location facility provider. In some examples, a customer churn risk engine uses data describing each customer to generate a churn risk score for each customer that indicates a likelihood that a customer will discontinue or reduce an amount of services obtained from the co-location facility provider. The data may include, e.g., interconnection data, power usage data, network usage data, customer history data, data describing customer visits to the facility, and data describing communications between the customer and the provider. For instance, the customer churn risk engine may apply a risk model for assessing a customer churn risk by assigning respective weights to the data items that are based on the characteristics and behavior of customers that have discontinued or decreased an amount of services obtained from the provider. Based on these weighted data items, the customer churn risk engine may further apply the model to generate respective churn risk scores for one or more customers of the provider.

The provider can use the churn risk score for each customer to develop pricing strategies, retention strategies, and/or mitigation strategies, depending on the particular attributes of each of the customers. For instance, upon learning that a customer has a very high churn risk score, the co-location facility provider may take immediate action to retain the customer or to prepare to re-rent the space currently occupied by the customer, for example. In some instances, an important customer with a high churn risk score may warrant a different pricing and retention strategy than a relatively less important customer with a similar churn risk score, because the loss of the important customer may result in the loss of additional customers that chose the communication facility based on the important customer's presence and availability for interconnection.

In one example, a method comprises querying, by a customer churn risk engine executing at a computing device, at least one of co-location data indicating co-location facility usage by a particular co-location facility customer and telemetry data indicating interconnections established between the particular co-location facility customer and at least one additional co-location facility customer within at least one co-location facility operated by a co-location facility provider; generating, by the customer churn risk engine and based at least in part on at least one of the co-location data and the telemetry data, a churn risk score for the particular co-location facility customer; and outputting, by the customer churn risk engine and for display to a display device, the churn risk score for the particular co-location facility customer.

In another example, a computer device comprises one or more processors operably coupled to a memory; a customer churn risk engine configured for execution by the one or more processors to query at least one of co-location data indicating co-location facility usage by a particular co-location facility customer and telemetry data indicating interconnections established between the particular co-location facility customer and at least one additional co-location facility customer within at least one co-location facility operated by a co-location facility provider; generate, based at least in part on at least one of the co-location data and the telemetry data, a churn risk score for the particular co-location facility customer; and output, for display to a display device, the churn risk score for the particular co-location facility customer.

In another example, A non-transitory computer-readable storage medium is encoded with instructions that, when executed, cause at least one processor of a computing device to query at least one of co-location data indicating co-location facility usage by a particular co-location facility customer and telemetry data indicating interconnections established between the particular co-location facility customer and at least one additional co-location facility customer within at least one co-location facility operated by a co-location facility provider; generate, based at least in part on at least one of the co-location data and the telemetry data, a churn risk score for the particular co-location facility customer; and output, for display to a display device, the churn risk score for the particular co-location facility customer.

The details of one or more examples are set forth in the accompanying drawings and the description below. Other features, objects, and advantages of the disclosure will be apparent from the description and drawings, and from the claims.

BRIEF DESCRIPTION OF DRAWINGS

FIG. 5 is an example user interface that indicates one or more customer churn risk scores based on one or more data items describing each customer, in accordance with techniques of the disclosure.

Like reference characters denote like elements throughout the figures and text.

DETAILED DESCRIPTION

Figure 1:
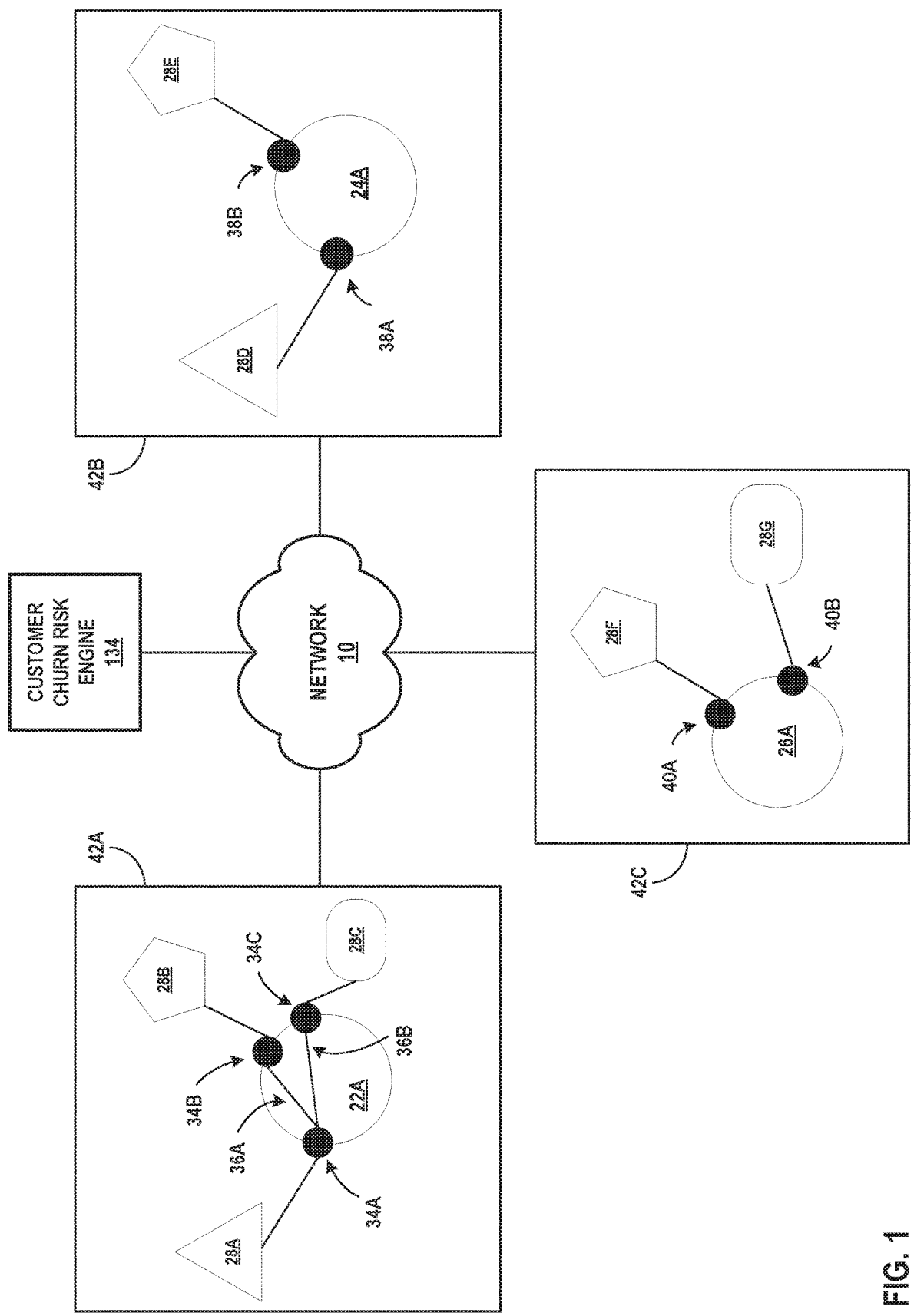
FIG. 1 is a conceptual diagram illustrating the interconnections between one or more co-location facility users at a communication facility, in accordance with one or more techniques of the disclosure.

Cloud computing refers to the use of dynamically scalable computing resources accessible via a network, such as the Internet. Computing resources, often referred to as a "cloud," provide one or more services to users. These services may be categorized according to service types, which may include for examples, applications/software, platforms, infrastructure, virtualization, and servers and data storage. The names of service types are often prepended to the phrase "as-a-Service" such that the delivery of applications/software and infrastructure, as examples, may be referred to as Software-as-a-Service (SaaS) and Infrastructure-as-a-Service (IaaS), respectively.

The term "cloud-based services" or, more simply, "services" refers not only to services provided by a cloud, but also to a form of service provisioning in which customers contract with service providers for the online delivery of services provided by the cloud. Service providers manage a public, private, or hybrid cloud to facilitate the online delivery of services to one or more customers. In some instances, multiple customers and service providers may have physical and/or logical network interconnections at co-location facility points that provide for high-speed transmission of information between the customers and service providers. The co-location facility may in such instances be alternatively referred to as an "interconnection facility."

A co-location facility provider ("provider") employs network infrastructure within a co-location facility that enables customers to connect, using interconnections established within the network infrastructure by the provider, to one another to receive and transmit data for varied purposes. For instance, a co-location facility may provide data transport services one or more cloud-based services. The co-location facility in this way offers customers connectivity to a vibrant ecosystem of additional customers including content providers, Internet service providers, carriers, and enterprises. Customers of the co-location facility may connect for such end-uses as service delivery, content delivery, financial services, and Internet access, to give just a few examples.

A co-location facility may offer products such as cage, cabinet, and power to its customers. A co-location facility may also offer products relating to interconnection such as cross-connect and virtual circuit. As a result, a co-location facility may be more than just a carrier hotel that provides off-site storage to its customers.

As used herein, the term "customer" of the co-location facility provider or "co-location facility user" may refer to a tenant of at least one co-location facility employed by the co-location facility provider, whereby the customer leases space within the co-location facility in order to colocate with other tenants for improved efficiencies over independent facilities as well as to interconnect network equipment with the other tenants'/customers' network equipment within the co-location facility or campus for reduced latency/jitter and improved reliability, performance, and security versus transport networks, among other reasons. A co-location facility typically hosts numerous customers and their network, server, and/or storage gear. Each customer may have particular reasons for choosing a co-location facility, including capacity, geographical proximity, connecting to other customers, co-locating with other customers, and price.

A co-location facility may provide one or more different types of interconnections between customer networks for customers colocated in the co-location facility. For instance, a co-location facility may provide physical or "layer-1" (in the Open Systems Interconnection model (OSI Model)) interconnections between co-location facility users.

Physical interconnections may include physical cross-connects that are established by category 5 or 6 (cat 5/6) cables, coaxial cables, and/or fiber optic cables, for instance. In some examples, a co-location facility may provide data link or "layer-2" (in the OSI Model) interconnections between co-location facility users. In some examples, a co-location facility that provides layer-2 interconnections may be referred to as an Ethernet Exchange, where Ethernet is the underlying layer-2 protocol. In some examples, a co-location facility may provide network and/or transfer or "layer-3/4" (in the OSI Model) interconnections between co-location facility users. In some examples, a co-location facility that providers layer-3/4 interconnections may be referred to an Internet Exchange, where TCP/IP are the underlying layer-3/4 protocols. For example, a co-location facility that provides an Internet Exchange may allow customer routers to directly peer with one another using a layer-3 routing protocol, such as Border Gateway Protocol, to exchange routes for facilitating layer-3 traffic exchange to provide private peering. In some examples, a co-location facility may provide indirect layer-3 routing protocol peering whereby each customer announces its layer-3 routes to an autonomous system (AS) deployed by the co-location facility provider within the co-location facility network infrastructure to provide private peering mediated by the AS. The AS may then relay these routes in conjunction with tunneling or other forwarding information to establish an interconnection between customers. In some examples, a co-location facility that provides indirect layer-3 routing protocol peering to facilitate service traffic exchange in this way may be referred to as a Cloud-based Services Exchange or, more simply, a Cloud Exchange. Additional description of a cloud exchange is found in U.S. Provisional Appl. No. 62/149,374, filed Apr. 17, 2015, entitled "CLOUD-BASED SERVICES EXCHANGE," the entire content of which is incorporated by reference herein.

In some examples, a "connection" may be a physical or logical coupling between a co-location facility user in a customer or provider network and a co-location facility point. An "interconnection" may be a physical or logical coupling between connections that couple at least two co-location facility users. As such, a network infrastructure configuration within a co-location facility that enables customer networks to connect to exchange data may be referred to herein as an "interconnection." A cross-connect interconnection may refer to a physical coupling between two co-location facility customer networks. An Ethernet interconnection may be a layer 2 coupling between two co-location facility customer networks via ports of the co-location facility. An Internet exchange interconnection may be a layer-3/4 coupling between two co-location facility customer networks via ports of the co-location facility. The foregoing examples of co-location facilities and interconnections are exemplary only and many other types of co-location facilities and interconnections are possible.

FIG. 1 is a block diagram illustrating co-location and interconnection between one or more co-location facility users, in accordance with one or more techniques of the disclosure. FIG. 1 illustrates multiple geographically distributed co-location facilities 42A, 42B, and 42C. Each of co-location facilities 42A-42C may be separated by a distance of 50 miles or more in some examples. As shown in FIG. 1, co-location facility 42A includes a co-location facility network 22A. Similarly, co-location facility 42B includes a co-location facility network 24A, and co-location facility 42C includes a co-location facility network 26A. In some examples, co-location facilities 42A-42C represent a metro-based interconnection exchange made up of multiple co-location facilities within a single metropolitan area.

In the example of FIG. 1, co-location facility network 22A includes connections 34A-34C by co-location facility users 28A-28C. For instance, co-location facility user 28A may represent a system or network of the user that is coupled to co-location facility network 22A by connection 34A. Similarly, co-location facility user 28B may be a system or network of the user that is coupled to co-location facility network 22A by connection 34B. Co-location facility user 28C may be a system or network of the user that is coupled to co-location facility network 22A by connection 34C. FIG. 1 further illustrates two interconnections 36A and 36B. Interconnection 36A may be a physical or logical coupling between connections 34A and 34B that couple co-location facility user 28A to co-location facility user 28B. Interconnection 36B may be a physical or logical coupling between connections 34A and 34C that couple co-location facility user 28A to co-location facility user 28B. As described above, a cross-connect interconnection may refer to a physical coupling (e.g., fiber or Cat5/6 cable between two network devices and/or systems of co-location facility users). An Ethernet interconnection may be a layer-2 coupling between two co-location facility users, such as one or more Virtual Local Area Networks (VLANs) or other logical networks providing L2 reachability. An Internet exchange interconnection may be a layer-3/4 coupling between two co-location facility users, such as a layer-3 network path provided by an Internet Exchange. In some examples, an interconnection may be a virtual circuit established at least in part within a co-location facility. The interconnections described herein may include at least one of a physical cross-connect, a virtual Ethernet connection providing a layer 2 forwarding path, a direct layer 3 peering arrangement to establish an end-to-end layer 3 forwarding path (e.g., using a layer 3 VPN), and an indirect layer 3 peering arrangement to establish an end-to-end layer 3 forwarding path (e.g., using a layer 3 VPN). Customers may establish multiple interconnections over a single physical port. For example, a customer may exchange data via a L2 interconnection with a first cloud service provider and via a L3 interconnection with a second cloud service provider, both the L2 and L3 interconnections operating over a single customer port for the customer. In some examples, an enterprise customer may have multiple interconnections, operating over a single port, with multiple different cloud service providers to receive cloud-based services.

In some examples, one or more of interconnections 36 may be based on an order for an interconnection being fulfilled by a programmable network platform and represented in co-location data, interconnection data, and/or telemetry data. For instance, in some examples, customer churn risk engine 134 may determine or receive information indicating one or more of interconnections 36 from customer records rather than from a network itself that indicates two customers have a connection. As such, an interconnection entry stored in one or more of co-location data, interconnection data, and/or telemetry data may represent a real or actual interconnection in the form of a cable, configuration, and/or virtual connection.

Customer churn risk engine 134 provides a score indicating a risk of a customer churn for a colocation business. To generate a customer churn risk score, customer churn risk engine 134 may apply a multi-variable analysis to multi-factor data describing customer usage of the co-location facilities 42. The multi-variable analysis may in some cases apply a combination of machine learning algorithms. To generate a customer churn risk score, customer churn risk engine 134 may apply a customer churn risk model to sources of co-location data such as power usage, network usage, customer user behavior on online portals, customer footprint in a facility in terms of space and power, customer profile, monthly recurring revenue (MRR), pricing, age of relationship, age of installations, and health of customer business, among others. Customer churn risk engine 134 may apply a customer churn risk model to telemetry data such as cross-connect installations and interconnection services (e.g., cross-connect and virtual circuit) purchased, among others.

FIG. 1 depicts customer churn risk engine 134 as connected to network 10, and customer churn risk engine 134 may access data describing customer usage of co-location facilities 42. This data may include data describing co-location facility users 28, interconnections 36, connections 34, or co-location facility networks 22, 24, or 26. Customer churn risk engine 134 may apply a churn risk model to co-location data, interconnection data, or telemetry data, for instance, indicating interconnections among customers 28. Customer churn risk engine 134 may also query historical interconnection data describing previous interconnections no longer operative within co-location facilities 42 and apply a churn risk model to the historical interconnection data. Customer churn risk engine 134 may output, for display to the co-location facility provider, the churn risk score generated by the customer churn risk engine 134 by application of churn risk model.

Figure 2:
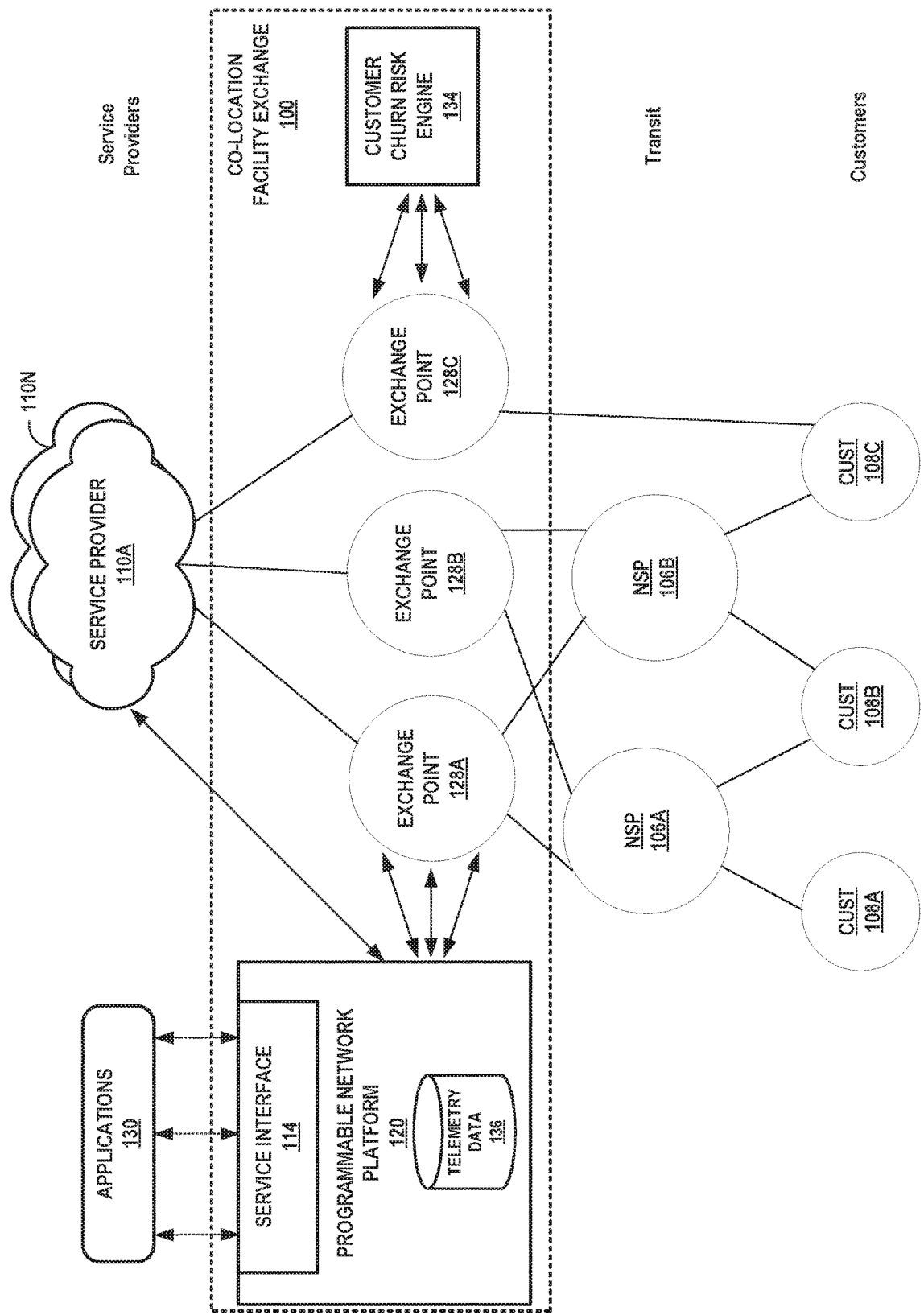
FIG. 2 is a block diagram that illustrates the interconnections between one or more co-location facility users at a communication facility, in accordance with techniques of the disclosure.

FIG. 2 is a block diagram that illustrates techniques for generating a churn risk score based on co-location data and telemetry data describing co-location facility exchange 100, in accordance with techniques of the disclosure. FIG. 2 depicts one embodiment of co-location facility exchange 100 and the interconnections between service providers 110 and customers 108. For instance, metro-based co-location facility exchange 100 may enable customers 108A-108C ("customers 108") to bypass the public Internet to directly connect to services providers 110A-110N ("SPs 110" or "service providers 110") so as to improve performance, reduce costs, increase the security and privacy of the connections, and leverage cloud computing for additional applications. The multiple SPs 110 participate in the co-location facility by virtue of their having at least one accessible port in the co-location facility by which a customer can connect to the one or more services offered by the SPs 110, respectively. According to various examples described herein, metro-based co-location facility exchange 100 may allow private networks of any customer to be directly cross-connected to any other customer at a common point, thereby allowing direct exchange of network traffic between the networks of the customers. Customers may include network carriers 106A-106B (collectively, "NSPs 106," or alternatively, "carriers 106"), enterprises, and other users of services offered by one or more service providers.

FIG. 2 illustrates a conceptual view of a network system 2 providing metro-based interconnection in which multiple co-location facility points located in a metropolitan area enable interconnection according to techniques described herein. Each of co-location facility exchange points 128A-128C (described hereinafter as "co-location facility points" and collectively referred to as "co-location facility points 128") of metro-based co-location facility exchange 100 (alternatively, "metro 100") may represent a different data center geographically located within the same metropolitan area ("metro-based," e.g., in New York City, N.Y.; Silicon Valley, Calif.; Seattle-Tacoma, Wash.; Minneapolis-St. Paul, Minn.; London, UK; etc.) to provide resilient and independent co-location facilities by which customers and service providers connect to receive and provide, respectively, services. In other words, metro 100 may include multiple co-location facilities geographically located with a metropolitan area. In some examples, each of the multiple co-location facilities geographically located with a metropolitan area may have low-latency links that connect the multiple co-location facilities in a topology to provide metro-based interconnection services between customers receiving interconnection services at different co-location facilities in the metro-based interconnect facility hub. In various examples, metro-based co-location facility hub 100 may include more or fewer co-location facility points 128. In some instances, metro-based interconnection exchanges 100 may include just one co-location facility exchange point 128. A co-location facility provider may deploy instances of co-location facilities 100 in multiple different metropolitan areas, each instance of metro-based co-location facility exchange 100 having one or more co-location facility exchange points 128.

Each of co-location facility exchange points 128 includes network infrastructure and an operating environment by which customers 108 receive services from multiple SPs 110. As noted above, an interconnection may refer to, e.g., a physical cross-connect, an Ethernet connection such as a Layer 2 VPN or virtual private LAN (e.g., E-LINE, E-LAN, E-TREE, or E-Access), an Internet exchange-based interconnection in which respective routers of interconnected customers directly peer and exchange layer 3 routes for service traffic exchanged via the metro-based co-location facilities exchange 100, and a cloud exchange in which customer routers peer with metro-based co-location facilities exchange 100 (or "provider") routers rather than directly with other customers.

For interconnections at layer-3 or above, customers 108 may receive services directly via a layer 3 peering and physical connection to one of co-location facility exchange points 128 or indirectly via one of NSPs 106. NSPs 106 provide "transit" by maintaining a physical presence within one or more of co-location facility exchange points 128 and aggregating layer 3 access from one or customers 108. NSPs 106 may peer, at layer 3, directly with one or more co-location facility exchange points 128 and in so doing offer indirect layer 3 connectivity and peering to one or more customers 108 by which customers 108 may obtain services from the metro-based co-location facility hub 100.

In instances in which co-location facility exchange points 128 offer a cloud exchange, each of co-location facility exchange points 128, in the example of FIG. 2, is assigned a different autonomous system number (ASN). For example, co-location facility exchange point 128A is assigned ASN 1, co-location facility exchange point 128B is assigned ASN 2, and so forth. Each co-location facility exchange point 128 is thus a next hop in a path vector routing protocol (e.g., BGP) path from service providers 110 to customers 108. As a result, each co-location facility exchange point 128 may, despite not being a transit network having one or more wide area network links and concomitant Internet access and transit policies, peer with multiple different autonomous systems via external BGP (eBGP) or other exterior gateway routing protocol in order to exchange, aggregate, and route service traffic from one or more service providers 110 to customers. In other words, co-location facility exchange points 128 may internalize the eBGP peering relationships that service providers 110 and customers 108 would maintain on a pair-wise basis. Instead, a customer 108 may configure a single eBGP peering relationship with a co-location facility exchange point 128 and receive, via the co-location facility, multiple services from one or more service providers 110. While described herein primarily with respect to eBGP or other layer 3 routing protocol peering between co-location facility points and customer, NSP, or service provider networks, the co-location facility points may learn routes from these networks in other way, such as by static configuration, or via Routing Information Protocol (RIP), Open Shortest Path First (OSPF), Intermediate System-to-Intermediate System (IS-IS), or other route distribution protocol.

As examples of the above, customer 108C is illustrated as having contracted with the co-location facility provider for metro-based co-location facility hub 100 to directly access layer 3 services via co-location facility exchange point 128C and also to have contracted with NSP 106B to access layer 3 services via a transit network of the NSP 106B. Customer 108B is illustrated as having contracted with multiple NSPs 106A, 106B to have redundant access to co-location facility exchange points 128A, 128B via respective transit networks of the NSPs 106A, 106B. The contracts described above are instantiated in network infrastructure of the co-location facility exchange points 128 by L3 peering configurations within switching devices of NSPs 106 and co-location facility exchange points 128 and L3 connections, e.g., layer 3 virtual circuits, established within co-location facility exchange points 128 to interconnect service provider 110 networks to NSPs 106 networks and customer 108 networks, all having at least one port offering connectivity within one or more of the co-location facility exchange points 128.

As shown in FIG. 2, programmable network platform 120 may include telemetry data 136. Telemetry data 136 may include metrics about the quantity, type, and definition of network and resource configurations that are configured by programmable network platform 120. Telemetry data 136 may include analytics information from infrastructure data collectors based on raw metrics data for resources used in a particular service.

In some examples, telemetry data 136 may include information that indicates connections of co-location facility users to co-location facility points. For instance, a co-location facility user may include a service customer or service provider. In some examples, a connection may be a physical or logical (e.g., L2 or L3) coupling between a co-location facility user in a user network (e.g., customer network or provider network) and a co-location facility point. Telemetry data 126 may include information that indicates interconnections between co-location facility users at a co-location facility point. In some examples, an interconnection may be a physical or logical coupling between at least two co-location facility users in a co-location facility point.

As shown in FIG. 2, customer churn risk engine 134 may be included in metro-based co-location facility exchange 100. In other examples, customer churn risk engine 134 may be implemented within programmable network platform 120. In some examples, customer churn risk engine 134 may be implemented outside of metro-based co-location facility exchange 100, such as in a different geographic location than metro-based co-location facility exchange 100. In any case, customer churn risk engine 134 may be operably coupled to programmable network platform 120, such that customer churn risk engine 134 may communicate with programmable network platform 120. As described in this disclosure, customer churn risk engine 134 may be implemented in hardware, software, or a combination of hardware and software. For example, customer churn risk engine 134 may be executed by one or more real servers in any of the co-location facilities described herein, or by another suitable computation environment.

In accordance with techniques of the disclosure, customer churn risk engine 134 may determine a churn risk score for each customer based at least in part on co-location data and telemetry data for the customer, and output such scoring data as opportunities to the co-location facility provider. A customer churn risk score may indicate that a particular co-location facility customer has a high likelihood of churning, and the provider may use the customer churn risk score to develop a strategy to retain the customer. Alternatively, the provider may use the customer churn risk score to prepare for the departure of the customer.

In operation, to generate scoring data, customer churn risk engine 134 may obtain a list of interconnections from programmable network platform 120. Programmable network platform 120 may include service interface 114 that may exchange information with applications 130. Customer churn risk engine 134 may identify sets of co-location facilities from the plurality of co-location facilities in which respective co-location facility customers are configured with existing interconnections based at least in part on querying co-location data that indicates co-location facility usage by a particular co-location facility customer and telemetry data that indicates interconnections of co-location facility customers within a plurality of co-location facilities administered by a co-location facility provider. For instance, customer churn risk engine 134 may determine a co-location facility user identifier that identifies a particular co-location facility user. Customer churn risk engine 134 may send a request or query to programmable network platform 120 for a set of interconnections that identify the target services to which the particular co-location facility user is already interconnected. In some examples, the set of interconnections may specify service identifiers of the target co-location facility users, geographic locations of co-location facilities, and/or identifiers of co-location facilities that include the interconnections, to name only a few examples.

Customer churn risk engine 134 may generate, based at least in part on the list of colocation data and interconnection data, the likelihood of a particular customer to churn, i.e., to discontinue or reduce an amount of services obtained from a co-location facility provider. In the time before a customer discontinues or reduces an amount of services obtained with a co-location facility provider, the customer may engage in certain behaviors or actions. These behaviors and actions may include, e.g., changes in the amount of co-location space leased in the co-location facility, a reduction in the number or size (e.g., bandwidth) of interconnections with other customers, quantity and quality of visits to the facility, and quantity and quality of communications with the provider, changes to power and/or network services usage. In addition, characteristics of the customer including a duration of the business relationship with the co-location facility provider, an age of co-location installations, health of the customer business as measured by, e.g., publicly-available revenue, sales, stock price, and other data may also denote an increase or decrease in the customer churn risk. Furthermore, customer churn risk engine 134 may use data describing an industry category in which a customer does business to generate a customer churn risk score.

Customer churn risk engine 134 may use the data described herein to generate a churn risk score for a particular co-location facility user. For instance, customer churn risk engine 134 may apply a churn risk model to the data described herein to generate a customer churn risk score for the particular user. The application of a churn risk model may involve machine learning algorithms that can receive and analyze multiple input variables populated by multi-factor data describing customer usage of the co-location facility exchange 100 and characteristics of the customer independent of usage of the co-location facility exchange 100. Machine learning algorithms may include, but are not necessarily limited to, algorithms such as neural networks, random forest, k-means, k-nearest neighbors, linear regression, decision tree, naïve Bayes classifier, support vector machines, and Gaussian processes.

Customer churn risk engine 134 may apply machine learning algorithms to historical data to identify the relative importance of each input variable. Customer churn risk engine 134 may use machine learning algorithms to fine-tune the churn risk model. Specifically, customer churn risk engine 134 may apply machine learning algorithms to historical data to measure how accurately the churn risk model predicted previous churns and non-churns. Customer churn risk engine 134 may use machine learning algorithms to calibrate the churn risk model by adjusting the weights associated with each input variable.

In some examples, customer churn risk engine 134 applies a least squares method for machine learning. Customer churn risk engine 134 may apply the churn risk model to a set of historical data, and may measure each of the inaccuracies of the churn risk model's prediction. Using the least squares method, for example, customer churn risk engine 134 may quantify and square the magnitude of each inaccuracy. Customer churn risk engine 134 may then apply one or more additional churn risk models and may square the magnitude of each inaccuracy for each churn risk model. In this example, using the least squares method, customer churn risk engine 134 may then select the churn risk model with the lowest sum of squares.

Customer churn risk engine 134 may have one or more input variables to which customer churn risk engine 134 applies a churn risk model. By identifying the relative importance of each input variable, customer churn risk engine 134 may assign weights to each input variable. For example, if customer churn risk engine 134 examines the historical data and identifies interconnection trend as a relatively important input variable and power usage as a relatively unimportant input variable, customer churn risk engine 134 may assign a relatively high weight to interconnection trend and a relatively low weight to power usage. Customer churn risk engine 134 may use a machine learning algorithm such as least squares to calibrate the weights of each input variable to minimize errors. There are many other machine learning algorithms that customer churn risk engine 134 may use, besides least squares, such as neural networks, random forest, Bayesian algorithms, k-means, support vector algorithms, and so forth.

In one example, customer churn risk engine 134 may assign specific weights to each input variable. The specific weights that customer churn risk engine assigns may correspond to the importance or influence of each input variable. Through the use of machine learning algorithms in this embodiment, customer churn risk engine 134 may adjust the specific weights for one or more input variables based on recent data. The receipt of data relating to users that recently churned or did not churn may prompt customer churn risk engine 134 to adjust the specific weights for one or more input variables. Example input variables include information from telemetry data and co-location data. Telemetry data may include interconnection data, cross-connect installations, and interconnection services (e.g., cross-connect and virtual circuit) purchased. Co-location data may include customer data, power usage data, or network usage data. The number or bandwidth of current interconnections, as well as previous trends for a customer, may be input variables. The length of time and the amount of server space that a customer has leased from a co-location facility provider may also be input variables. Publicly available financial information such as stock price and reported earnings may also be input variables.

In some examples, customer churn risk engine 134 may output, for display to the co-location facility provider, the scoring data. For instance, customer churn risk engine 134 may output for display a set of customers along with each customer's churn risk score in, for example, results user interface (UI) 616. Each churn risk score may represent the likelihood that the respective customer will churn. Churn may include a customer leaving a co-location facility and ceasing its relationship with a co-location facility provider. Churn may also include a reduction in services purchased or leased by a customer from a co-location facility provider. In some embodiments, churn may include any change in the terms of the relationship between a customer and a co-location facility provider. In one example, a co-location facility provider may be able to modify what is classified as churn in customer churn risk engine 134.

Alternatively, each churn risk score may represent the revenue loss associated in the event that the respective customer churns. Moreover, each churn risk score may correspond to the number of other customers that may have an increased likelihood of churn in the event that the respective customer churns. Results UI may display the churn risk scores in numerical format (e.g., a value in the range 0-100), in letter grades (A through F), or any other suitable symbol for indicating a relative churn risk for customers. Results UI may display the churn risk scores as a likelihood or percentage that a particular customer in a specific product category will churn in given time period. In some examples, Results UI may display a message such as "customer X has a 68% likelihood of churn for co-location during the next three months."

Certain customers in a communication facility, such as cloud computing firms and financial exchanges, may carry extra importance, attracting other customers and increasing the provider's bargaining power with respect to the other customers. If a major customer discontinues its relationship with a provider, the provider may not only need to re-rent the vacant space in the facility but may also apply additional effort to retain the other customers who may have chosen the communication facility based on the first customer's presence there. As a result, it may be important to a co-location facility provider's viability to anticipate and prevent any loss of its most important customers.

Figure 3:
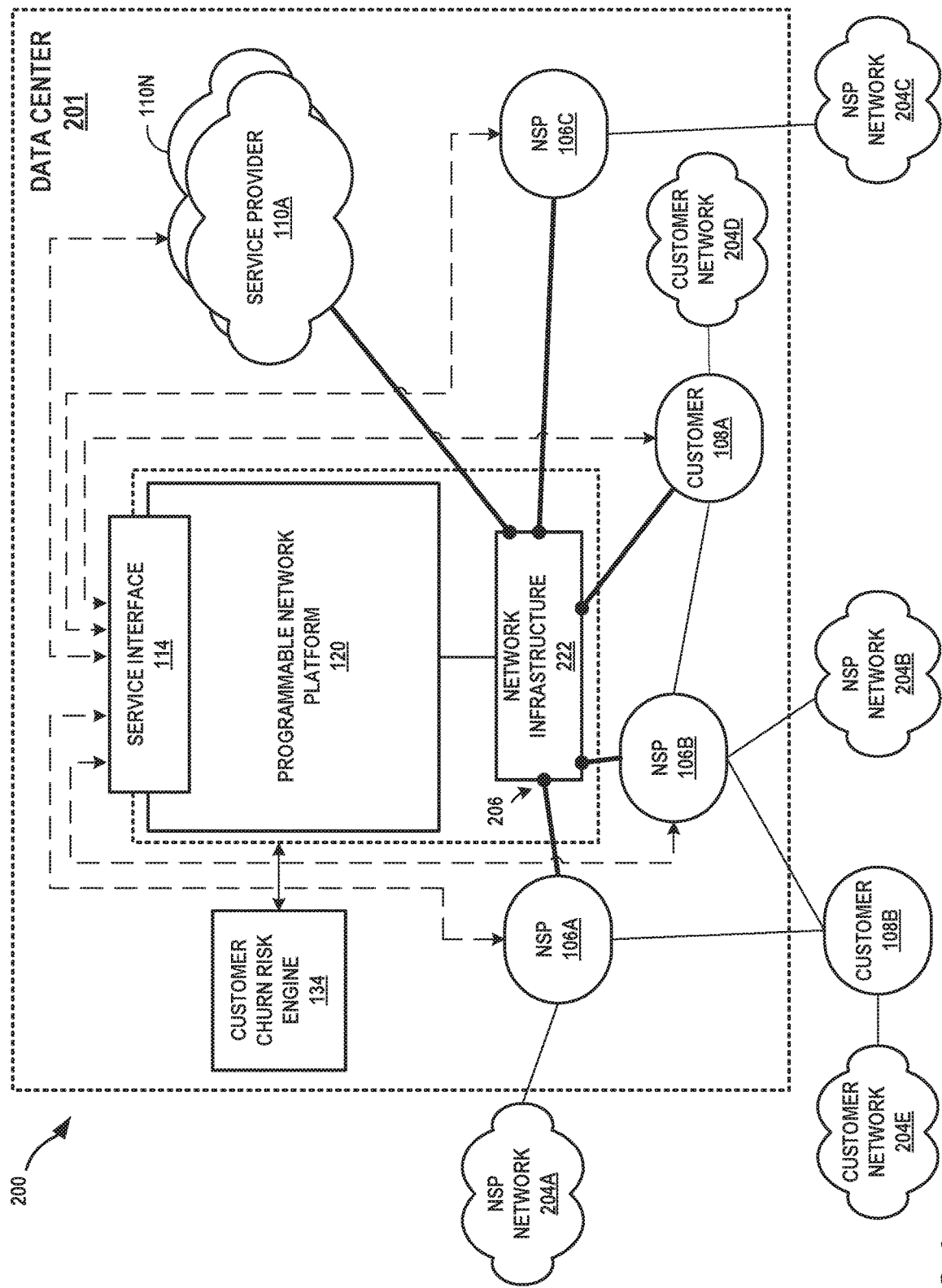
FIG. 3 is a block diagram illustrating a high-level view of a data center that provides an operating environment for a co-location facility, in accordance with techniques of the disclosure.

FIG. 3 is a block diagram illustrating a high-level view of a data center 201 that provides an operating environment for a co-location facility 200, and a customer churn risk engine 134 that generates customer churn risk scores, in accordance with techniques of the disclosure. Co-location facility 200 allows a corresponding one of customer networks 204D, 204E and NSP networks 204A-204C (collectively, "'private' or 'carrier' networks 204") of any NSPs 106A-106C or other customers including customers 108A, 108B to be directly cross-connected, via a layer 2 (L2) or layer 3 (L3) connection to any other customer network and/or to any of service providers 110A-110N, thereby allowing exchange of service traffic among the customer networks and SPs 110. Data center 201 may be entirely located within a centralized area, such as a warehouse or localized data center complex, and provide power, cabling, security, and other services to NSPs, customers, and service providers that locate their respective networks within the data center 201 (e.g., for co-location) and/or connect to the data center 201 by one or more external links.

Network service providers 106 may each represent a network service provider that is associated with a transit network by which network subscribers of the NSP 106 may access services offered by SPs 110 via the co-location facility 200. In general, customers of SPs 110 may include network carriers, large enterprises, managed service providers (MSPs), as well as Software-as-a-Service (SaaS), Platform-aaS (PaaS), Infrastructure-aaS (IaaS), Virtualization-aaS (VaaS), and data Storage-aaS (dSaaS) customers for such services as are offered by the SPs 110 via the co-location facility 200.

As shown in FIG. 3, data center 201 may include customer churn risk engine 134. Customer churn risk engine 134 may be operably coupled to programmable network platform 120, such that customer churn risk engine 134 may communicate with programmable network platform 120. In accordance with techniques of the disclosure, customer churn risk engine 134 may determine churn risk scoring data for co-location facility customers, and output such scoring data to a co-location facility provider. Customer churn risk engine 134 may further provide a co-location facility provider with an indication of the likelihood that a customer will churn.

In some examples, customer churn risk engine 134 may select a co-location facility customer. For example, customer 108A may be located in data center 201 and may be interconnected with other customers in data center 201. As such, customer churn risk engine 134 may query co-location data indicating co-location facility usage by customer 108A and telemetry data indicating interconnections established between customer 108A and other co-location facility customers at data center 201. Customer churn risk engine 134 may query co-location data and telemetry data for co-location facilities other than co-location facility 200 and data center 201. Customer churn risk engine 134 may apply a churn risk model to the co-location data and the telemetry data in order to generate a churn risk score for customer 108A. In one example, customer churn risk engine 134 may generate a churn risk score based on data describing interconnections, such as the number, size, bandwidth, and network usage, that customer 108A has established with other customers 108, NSPs 106, and SPs 110. In another example, customer churn risk engine 134 may compare the number and strength of the interconnections of customer 108A to the average number and strength of interconnections for all customers.

In another example, customer churn risk engine 134 may use data describing the number and strength (e.g., size/bandwidth and network usage of interconnections) of the interconnections of customer 108A, along with one or more machine learning algorithms, to generate a churn risk score. Machine learning algorithms applied by customer churn risk engine 134 may take many forms and may include various variable importance measuring methods like regression analysis, Gini importance, permutation importance, and other measurements for determining statistical significance. Regression analysis may provide an equation, algorithm, and/or coefficients for a multi-variable analysis that, when applied to data described herein, produces a customer churn risk score. Customer churn risk engine 134 may periodically perform regression analysis or another tool using then-existing data to update the equation or algorithm for future use.

Figure 4:
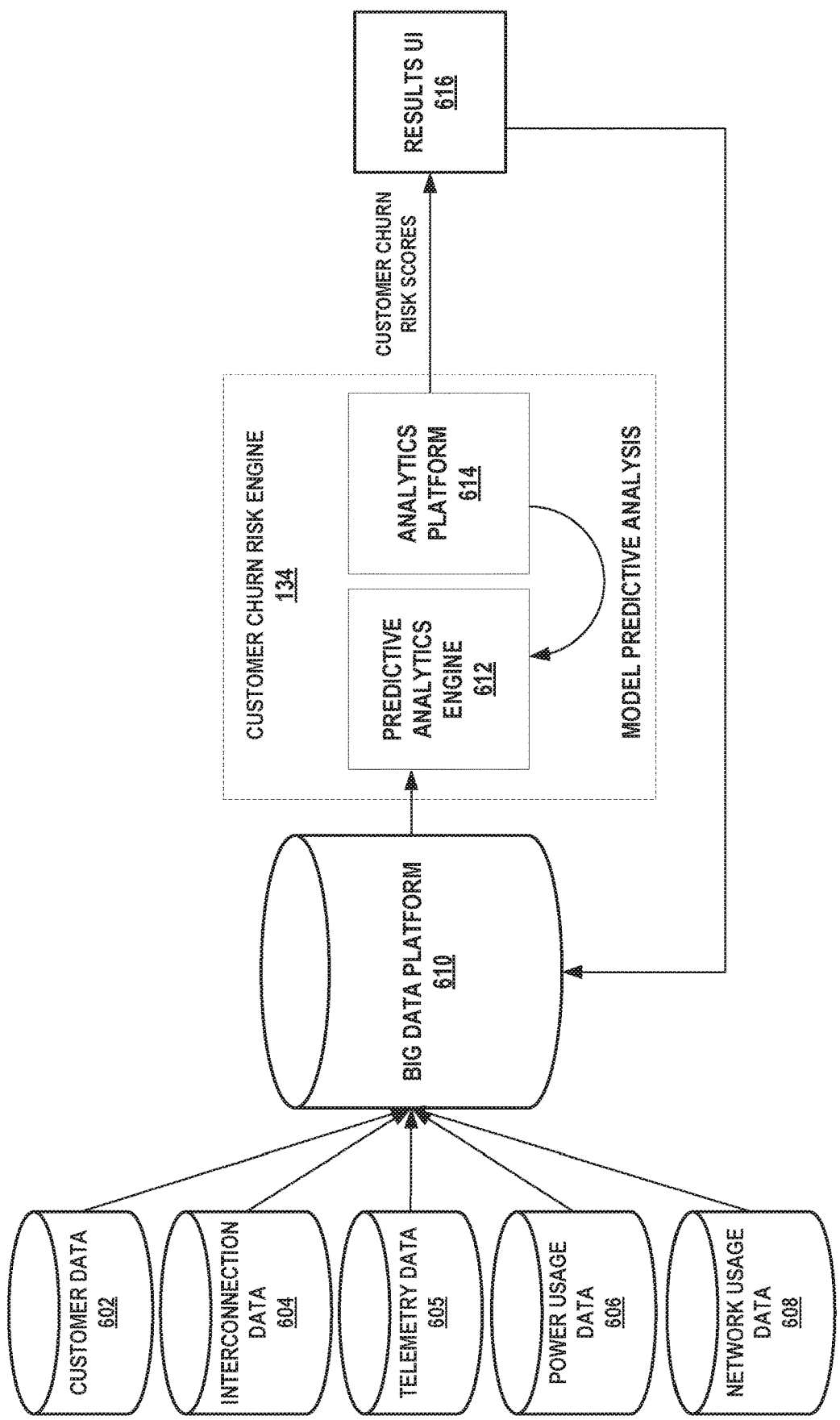
FIG. 4 is a conceptual diagram of components used to generate the customer churn risk scores, in accordance with techniques of this disclosure.

FIG. 4 is a conceptual diagram of logical components that are used to provide scoring data, in accordance with techniques of this disclosure. Each of components 602-616 and 134 may be implemented in hardware, software, or a combination of hardware and software. As shown in FIG. 4, customer churn risk engine 134 may include a predictive analytics engine 612, which generates scoring data in accordance with techniques of this disclosure, and an analytics platform 614, which identifies customers that may have a higher likelihood of churning. To provide scoring data, customer churn risk engine 134 may query big data platform 610 for information, such as but not limited to customer data, co-location facility user information, connection and interconnection information, co-location facility information, power and network usage data, to name only a few examples. Using this information customer churn risk engine 134 may generate scoring data for co-location facility users.

In the example of FIG. 4, big data platform 610 may provide analysis, capture, data curation, search, sharing, storage, transfer, visualization of data received from, but not limited to, customer data 602, interconnection data 604, telemetry data 605, power usage data 606, and network usage data 608. In some examples, each of customer data 602, interconnection data 604, telemetry data 605, power usage data 606, network usage data 608, and big data platform 610 may be implemented in a Relational Database Management System (RDBMS), Object Database Management System (ODBMS), Online Analytical Processing (OLAP) system, or Big Data Computing system, to name only a few examples. Big data platform may receive data from one or more of customer data 602, interconnection data 604, telemetry data 605, power usage data 606, and network usage data 608 on a periodic, user prompted, or real-time basis. Co-location data may comprise customer data 602, power usage data 606, and network usage data 608.

Customer data 602 may include information that identifies a co-location facility user, billing information for the co-location facility user, location information for the co-location facility user, co-location/interconnection preference information for the co-location facility user, to name only a few examples. Interconnection data 604 (or telemetry data) may, as described in FIG. 2, include metrics about the quantity, type, and definition of network and resource configurations that are configured by programmable network platform 120. Interconnection data 604 may include analytics information from infrastructure data collectors based on raw metrics data for resources used in a particular service. In some examples, interconnection data 604 includes connection information that describes a connection that a co-location facility user has to a co-location facility network. In some examples, interconnection data 604 includes interconnection information that describes an interconnection between at least two customer networks at a co-location facility point or co-location facility.

In an example embodiment, interconnection data may include data describing prior interconnections of a particular co-location facility customer. Data describing prior interconnections may provide customer churn risk engine 134 with context for data describing current interconnections. In this way, customer churn risk engine 134 may use data describing prior interconnections may as an independent variable to generate a customer churn risk score.

Customer churn risk engine 134 may determine an interconnection trend for a particular co-location facility customer by using data indicating prior interconnections for the customer. Customer churn risk engine 134 may compare the data indicating prior interconnections for the customer with telemetry data indicating interconnections established between a particular customer and at least one additional customer. For example, if the number and size of a particular co-location facility customer's interconnections have increased or decreased, customer churn risk engine 134 may determine an interconnection trend that customer churn risk engine 134 can incorporate into its multi-variable analysis.

Telemetry data 605 may include metrics describing the transmission of data in or through a co-location facility by a particular co-location facility user. Telemetry data 605 may be similar to interconnection data 604 or network usage data 608, but telemetry data 605 may indicate a current configuration of a co-location facility network for interconnecting customers. Power usage data 606 may include information that indicates the amount of electrical power consumed by a particular co-location facility customer's servers and other equipment. Network usage data 608 may include information that indicates the amount of data that a particular co-location facility customer has sent or received. Network usage data 608 may include information describing the size and number of data transmissions corresponding to a particular co-location facility customer, to name only a few examples.

Power usage data 606 and network usage data 608 may include information describing historical power usage and network usage for a particular co-location facility customer in order to provide reference for comparing the current or recent power usage and network usage. In one example, the customer churn risk engine 134 may consider whether a customer's power usage or network usage is increasing or decreasing. In another embodiment, the customer churn risk engine 134 may assign a higher score if the power usage or network usage for a particular customer recently declined, as compared to another customer with a recent increase in power usage and network usage.

As shown in FIG. 4, customer churn risk engine 134 includes predictive analytics engine 612 and analytics platform 614. In accordance with techniques of this disclosure, predictive analytics engine 612 may select a co-location facility customer. Predictive analytics engine 612 may identify telemetry data 605 indicating interconnections established between a particular co-location facility customer and other additional co-location facility customers. Predictive analytics engine 612 may generate scoring data for the co-location facility customers based at least in part on the telemetry data 605. Predictive analytics engine 612 may output the scoring data for display to a co-location facility provider.

In some examples, the scoring data includes scoring data for a co-location facility customer. In such examples, the scoring data is further based on at least one characteristic of the particular co-location facility customer, such as one or more of customer data 602, interconnection data 604, telemetry data 605, power usage data 606, and network usage data 608. The scoring data may be based on additional characteristics such as the duration that a customer has been at a particular facility or facilities, the quantity and quality of customer visits to facility or facilities and customer communications with the providers of those facilities, and the type of business for a customer, such as cloud computing, network service provider, retailer, or manufacturing, and so forth. Predictive analytics engine 612 may use machine learning algorithms to modify the manner in which it generates scoring data.

In some examples, predictive analytics engine 612 may rank each co-location facility customer based on the scoring data. This may be represented in the output displayed to a co-location facility provider at results UI 616. As described above, the characteristics may include a customer name, a business type, a location of a co-location facility or facilities where the customer is located, an amount of space that the customer has leased, a price that the customer pays, a number of existing customer interconnections with other colocated customers, and so forth. The scoring data may also indicate the strength of any of the customer's interconnections with other customers.

In some examples, the predictive analytics engine 612 may score a co-location facility customer according to the scores for other co-location facility customers with similar characteristics, such as customer data 602, interconnection data 604, telemetry data 605, power usage data 606, and network usage data 608, business type, and facility location. A customer profile for a customer may also include pricing information for services, the customer market segment(s), services offered or consumed, revenue, bandwidth consumed, and other customer data. Customer data 602 may store such customer profiles. The predictive analytics engine 612 may compare the profiles of customers with similar characteristics in order to generate a customer churn risk score.

In some examples, predictive analytics engine 612 may generate scoring data based on possible revenue losses. For example, for each interconnection customer, predictive analytics engine may calculate a revenue loss estimation based on current price paid by the customer, the amount of spaced leased by the customer, other customers who have interconnected with the customer, and the customer's likelihood of churn. For instance, a particular co-location facility customer may pay $100,000 per month to lease space at one or more co-location facilities. If the customer has a churn likelihood of 30%, the predictive analytics engine 612 may determine an expected loss of $30,000 per month.

Analytics platform 614 may request customer information from big data platform 610 for a particular customer to determine that customer's churn risk score. Analytics platform 614 may identify a particular co-location facility customer with a high churn risk score, as compared to the average customer churn risk score for the facility or the average customer churn risk score for all of the facilities owned or managed by the provider. Analytics platform 614 may determine that a co-location facility customer has a higher churn risk score because of, for example, a quantity or quality of interconnections that the customer has with other customers, or the power and network usage of the customer. In generating the customer churn score, the analytics platform may consider past data for the particular customer or for other customers. Accordingly, analytics platform 614 may generate a list of co-location facility customers that have a moderate or high likelihood of churning, as compared to the average for the facility or facilities. For instance, analytics platform 614 may provide the list of customers in a results user interface 616. Details of results user interface 616 for customer churn risk analysis are further described in FIG. 5. In some examples, analytics platform 614 may send one or more messages to the co-location facility provider, such as an email, text message, or other suitable communication.

As with customer churn risk scores, analytics platform 614 may generate a list of co-location facility customers that may be provided to the co-location facility provider. For instance, analytics platform 614 may provide a list of the customers with the highest customer churn risk scores or a list of the customers with the highest likelihood of discontinuing their relationship with the provider in the certain time period such as the next twelve months. In another example, analytics platform 614 may provide a list of the customers with the highest churn impact, which may represent the likelihood that a particular customer will churn, multiplied by the loss of revenue in the event of churn. Details of results user interface 616 for churn risk analysis are further described in FIG. 5. In some examples, analytics platform 614 may send one or more messages to the co-location facility provider, such as an email, text message, or other suitable communication.

In some examples, the co-location facility provider may interact with results user interface 616 to view and select customers and their churn risk scores for further action. For instance, the co-location facility provider may provide a user input that causes a message to be sent from the co-location facility provider to one or more of the co-location facility customers. The message may communicate a message from the provider, such as a survey to gauge the customer's satisfaction with the co-location facilities or a communication relating to price based on the customer churn risk scores presented by results user interface 616.

FIG. 5 is an example user interface that indicates scoring data based on one or more customer churn risk scores, in accordance with techniques of the disclosure. In some examples, customer churn risk analysis user interface 750 may be generated by customer churn risk engine 134 as described in FIG. 2 and output to a display (e.g., a computer monitor or a tablet, smartphone, or PDA interface). Customer churn risk analysis user interface 750 may be generated by customer churn risk engine 134 for a co-location facility provider, such that the information included in customer churn risk analysis user interface 750 contains the customers of the co-location facility provider. Customer churn risk analysis user interface 750 may include one or more user interface elements to output information, such as but not limited to: labels, input fields, drop-down menus, buttons, images, tab controls, and navigation controls to name only a few examples.

Customer churn risk analysis user interface 750 may include a customer list element 752. Customer list element 752 may display a list of all of the customers of a co-location facility provider at one or more co-location facilities. Customer list element 752 may also include several variables describing each customer, including name, industry, facility locations, amount of space rented, price, and length of time as a customer. Interconnectivity scores element 754 may include a total count of existing interconnections for a set of customers at one or more co-location facilities, as described in accordance with techniques of this disclosure. Customer churn risk analysis user interface 750 may also include a churn impact list element 756. Churn impact list element 756 may include a set of customers organized by the impact of each customer's potential churn as determined by customer churn risk engine 134, as described in accordance with techniques of this disclosure.

In some examples, customer churn risk analysis user interface 750 may include a detailed customer churn risk report 760 that includes records for multiple different customers described by customer elements 764A-764F (collectively, "customer elements 764"). Although six customer user interface elements are illustrated for example purposes, any number of records for corresponding customers may be included in customer churn risk report 760. Each of customer elements 764 may identify a specific co-location facility customer. As an example, customer element 764A may include a name, logo, or other identifier of a particular co-location facility user.

As described above, each customer corresponding to one of customer elements 764 may be associated with a particular churn risk score. For example, the scoring data may indicate how likely each customer is to discontinue or reduce its presence at one or more co-location facilities during a certain time period. In other examples, customer churn risk report 760 may create a more detailed churn estimation for each customer. In one embodiment, customer churn risk engine 134 can estimate a churn risk score based on the estimated revenue loss associated with each customer. The customer associated with customer element 764A may pay $500,000 per month to lease space at one or more co-location facilities. If the particular co-location facility customer has a churn risk likelihood of 30%, then the customer associated with customer element 764A may have a revenue loss estimation of $150,000 per month or $1.8 million per year. In this example, the detailed customer churn risk report 760 allows the provider to estimate the weight that the provider may give to each potential customer churn. The detailed customer churn risk report 760 may also include an estimation of the potential revenue loss associated with other customers that may be colocated with the customer associated with customer element 764A.

Customer churn risk analysis user interface 750 may also include churn risk score user elements 766A-766F (collectively, "churn risk score elements 766") that may be associated with customer elements 764. Churn risk score elements 766 may be expressed in many forms, including but not limited to a numerical score of 0 to 100, or a letter grade from A to F. Customer churn risk analysis user interface 750 may also include churn impact user elements 768A-768F (collectively, "churn impact elements 768") that may be associated with customer elements 764. Churn impact elements 768 may be expressed in many forms, including but not limited to a dollar amount associated with a potential churn or a count of other customers that may consequently have an increased churn risk score in the event that the corresponding customer churns.

Customer churn risk analysis user interface 750 may include churn reasons user elements 770A-770F ("collectively, "churn reasons elements 770"). Churn reasons elements may explain significant factors in the churn risk score for respective customers associated with customer elements 764. For example, if the power usage of a customer associated with customer element 764A was a significant factor in determining a churn risk score, churn reasons element 770A may display: "The power usage has declined by more than 50%." In another example, if the interconnection trend of a customer associated with customer element 764B was a significant factor in determining a churn risk score, churn reasons element 770B may display "The interconnections with other customers have increased."

Figure 6:
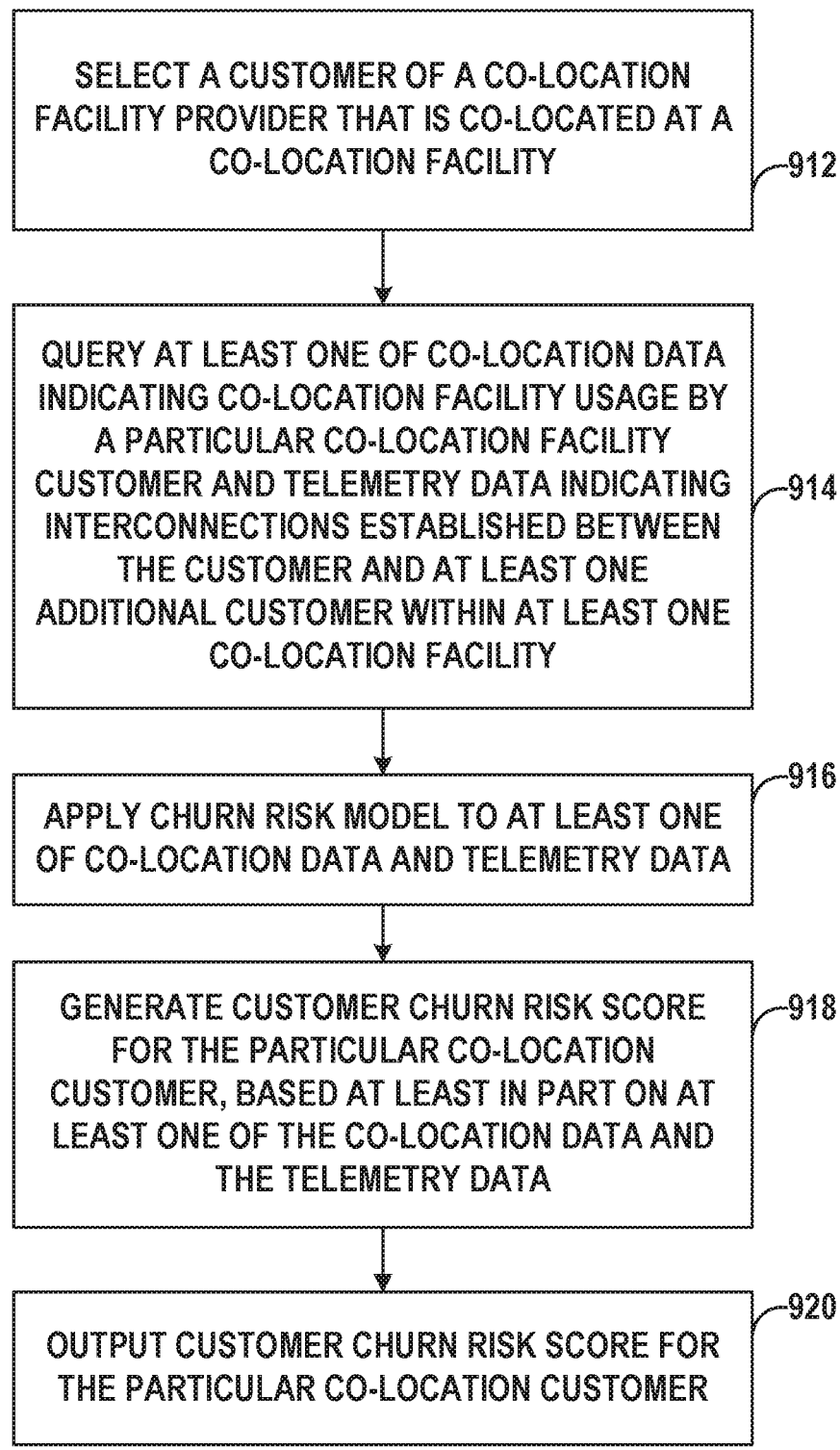
FIG. 6 is a flow diagram illustrating example operations of a computing device that determines customer churn risk scores based on one or more data items describing each customer, in accordance with techniques of the disclosure.

FIG. 6 is a flow diagram illustrating example operations of a computing device that provides scoring data based on the churn risk of one or more co-location facility customers, in accordance with techniques of the disclosure. For purposes of illustration, the example operations are described below within the context of customer churn risk engine 134, as shown in FIG. 2. Techniques described herein may be performed in response to a request from a user of the computing device, which may include an employee of a co-location facility provider accessing a portal. Customer churn risk engine 134 may select a co-location facility customer that is colocated at a co-location facility (912).

To calculate a customer churn risk score, customer churn risk engine 134 may query co-location data indicating co-location facility usage by a particular co-location facility customer and telemetry data indicating interconnections established between the particular customer and at least one additional customer within a plurality of co-location facilities (914). Customer churn risk engine 134 may apply a churn risk model to the co-location data and the telemetry data for the particular customer (916). Customer churn risk engine 134 may then generate a customer churn risk score for the particular co-location facility customer, based at least in part on the co-location data and the telemetry data for the customer (918). Customer churn risk engine 134 may output customer churn risk score for the particular interconnection customer (920).

Customer churn risk engine 134 may query co-location data, telemetry data, or other sets of data for a particular co-location facility customer. Customer churn risk engine 134 may apply a churn risk model to the data. Customer churn risk engine 134 may use machine learning algorithms to determine the importance of various input variables. Machine learning algorithms applied by customer churn risk engine 134 may take many forms and may include various variable importance measuring methods like regression analysis, Gini importance, permutation importance, and other measurements for statistical significance. The churn risk model may be based on regression analysis using one or more independent variables that may comprise interconnection data, telemetry data, and co-location data such as customer data, power usage data, or network usage data. Customer churn risk engine 134 may select one or more independent variables, such as the number of interconnections for a customer or the amount of space leased by the customer. Customer churn risk engine 134 may determine or adjust the weight or influence associated with the particular independent variable based on previous data of customers that churned or that did not churn. In this example, the customer churn risk score may be a dependent variable, and data on past customer churns may be used to develop the churn risk model.

Customer churn risk engine 134 may generate scoring data for the co-location facility customer based at least in part on the data, which may include interconnection data, telemetry data, and co-location data, such as customer data, power usage data, or network usage data. Customer churn risk engine 134 may output the scoring data for display to the co-location facility provider on a display device.

In some examples, the scoring data may include scoring data that relates to the likelihood that a particular co-location facility customer will churn. In such examples, customer churn risk engine 134 may output the scoring data as a percentage, a numerical score, a letter grade, or in some other manner. In other examples, the scoring data may include an indication of the potential revenue loss associated with the potential customer churn. In another set of examples, the scoring data may include a count of the number of other customers that interconnect with the particular co-location facility customer. In this set of examples, the customer churn risk engine 134 may consider the likelihood that one or more of the other customers may have an increase likelihood of churning in the event that the particular co-location facility customer churns. In some examples, customer churn risk engine 134 may output the churn risk score as a likelihood that a particular customer will churn in a given time period, such as "customer X has a 68% likelihood of churn during the next three months."

Customer churn risk engine 134 may group or rank each of the customers based on churn risk score. As described above, the scoring data for a particular customer may be representative of the likelihood that the customer will churn, the impact on revenue if the customer churns, or the number and/or quality of interconnections of the particular customer combined with the likelihood that the customer will churn. For example, predictive analytics engine 612 may estimate revenue loss based on the price paid by the customer and the likelihood that the customer will churn. For instance, using this method, a customer with a churn likelihood of 10% that pays $100,000 per month may have the same churn risk score as a customer with a churn likelihood of 1% that pays $1 million per month.

In one embodiment, customer churn risk engine 134 may generate a new churn risk score for a particular co-location facility customer once per month. In another embodiment, customer churn risk engine 134 may generate a new churn risk score more or less frequently than once per month. If customer churn risk engine 134 generates a new churn risk score more frequently than once per month, the data may not change much or may not change at all, resulting in little or no change in the churn risk score. If customer churn risk engine 134 generates a new churn risk score less frequently than once per six months, then customer churn risk engine 134 may not catch a change in the data 602-608 that results in a change in the churn risk score. Therefore, a co-location facility provider may balance a desire for up-to-date churn risk scores with a reality that data 602-608 may not change substantially in short time period.

In some examples, the particular simulation may be saved for future reference. For example, a set of criteria, including customer data, telemetry data, and history of usage data may be used for a future simulation. This set of criteria may be saved in a memory of a computing device such that a user may access the simulation at a later date in order to reevaluate the simulator results.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such as a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various examples of the disclosure have been described. Any combination of the described systems, operations, or functions is contemplated. These and other examples are within the scope of the following claims.

What is claimed is:
1. A method comprising:
  querying, by a customer churn risk engine executing at a computing device, co-location data indicating co-location facility usage by a particular co-location facility customer;
  querying, by the customer churn risk engine, telemetry data indicating interconnections established between and enabling communications between the particular co-location facility customer and at least one additional co-location facility customer within at least one co-location facility operated by a co-location facility provider, wherein at least one of the co-location data and the telemetry data indicates, for the particular co-location facility customer, multi-factor data for one or more of a number of interconnections, power usage, or network usage by the particular co-location facility customer;
  querying, by the customer churn risk engine, data indicating prior interconnections of the particular co-location facility customer;

determining, by the customer churn risk engine, an interconnection trend for the particular co-location facility customer by comparing the data indicating prior interconnections of the particular co-location facility customer with the telemetry data indicating interconnections established between and enabling communications between the particular co-location facility customer and at least one additional co-location facility customer within a plurality of co-location facilities operated by the co-location facility provider;

generating, by the customer churn risk engine and based at least in part on the co-location data, the interconnection trend, and the telemetry data, a churn risk score for the particular co-location facility customer, wherein generating the churn risk score comprises applying, by the customer churn risk engine to the multi-factor data, a churn risk model that specifies respective weights for factors of the multi-factor data;

outputting, by the customer churn risk engine and for display to a display device, the churn risk score for the particular co-location facility customer;

generating, by the computing device, a message to the particular co-location facility customer based on the churn risk score for the particular co-location facility customer; and sending, by the computing device, the message to the particular co-location facility customer.

2. The method of claim 1, wherein the co-location data comprises usage data indicating at least one of the power usage and the network usage by the particular co-location facility customer.

3. The method of claim 1, wherein each of the interconnections established between and enabling communications between the particular co-location facility customer and at least one additional co-location facility customer comprises at least one of a physical cross-connect, a layer 2 forwarding path, and a layer 3 forwarding path.

4. The method of claim 1, wherein each of the interconnections established between and enabling communications between the particular co-location facility customer and at least one additional co-location facility customer comprises a virtual circuit between an enterprise customer and a cloud service provider customer.

5. The method of claim 1, further comprising:
applying at least one machine learning algorithm to data describing one or more co-location facility customers that have previously churned; and
using an output from the at least one machine learning algorithm to determine the respective weights for factors of the multi-factor data.

6. The method of claim 1, wherein the churn risk model specifies a weight of the respective weights for the interconnection trend.

7. The method of claim 1, wherein at least one of the co-location data and the telemetry data indicates, for the particular co-location facility customer, the multi-factor data for one or more of a co-location facility footprint, a customer profile, pricing data, an age of relationship, or an age of customer installation to the co-location facility.

8. The method of claim 1,
wherein outputting the churn risk score comprising presenting a user interface that displays the churn risk score for the particular co-location facility customer,
wherein the method further comprises receiving, at the customer churn risk engine, user input via the user interface, the user input based on the churn risk score, and wherein sending the message comprises sending, by the customer churn risk engine, the message to the particular co-location facility customer in response to receiving the user input.

9. A computing device comprising:
one or more processors operably coupled to a memory;
a customer churn risk engine configured for execution by the one or more processors to:
query co-location data indicating co-location facility usage by a particular co-location facility customer;
query telemetry data indicating interconnections established between and enabling communications between the particular co-location facility customer and at least one additional co-location facility customer within at least one co-location facility operated by a co-location facility provider, wherein at least one of the co-location data and the telemetry data indicates, for the particular co-location facility customer, multi-factor data for one or more of a number of interconnections, power usage, or network usage by the particular co-location facility customer;
query data indicating prior interconnections of the particular co-location facility customer;
determine an interconnection trend for the particular co-location facility customer by comparing the data indicating prior interconnections of the particular co-location facility customer with the telemetry data indicating interconnections established between and enabling communications between the particular co-location facility customer and at least one additional co-location facility customer within a plurality of co-location facilities operated by the co-location facility provider;
generate, based at least in part on the co-location data, the interconnection trend, and the telemetry data, a churn risk score for the particular co-location facility customer by applying a churn risk model that specifies respective weights for factors of the multi-factor data;
output, for display to a display device, the churn risk score for the particular co-location facility customer;
generate a message to the particular co-location facility customer based on the churn risk score; and
send the message to the particular co-location facility customer.

10. The computing device of claim 9, wherein the co-location data comprises usage data indicating at least one of the power usage and the network usage by the particular co-location facility customer.

11. The computing device of claim 9, wherein each of the interconnections established between and enabling communications between the particular co-location facility customer and at least one additional co-location facility customer comprises at least one of a physical cross-connect, a layer 2 forwarding path, and a layer 3 forwarding path.

12. The computing device of claim 9, wherein each of the interconnections established between and enabling communications between the particular co-location facility customer and at least one additional co-location facility customer comprises a virtual circuit between an enterprise customer and a cloud service provider customer.

13. The computing device of claim 9, wherein the customer churn risk engine is further configured to:
apply at least one machine learning algorithm to data describing one or more co-location facility customers that have previously churned; and use an output from the at least one machine learning algorithm to determine the respective weights for factors of the multi-factor data.

14. The computing device of claim 9, wherein the churn risk model specifies a weight of the respective weights for the interconnection trend.

15. The computing device of claim 9, wherein the co-location data and the telemetry data indicates, for the particular co-location facility customer, multi-factor data for one or more of a co-location facility footprint, a customer profile, pricing data, an age of relationship, or an age of customer installation to the co-location facility.

16. The computing device of claim 9,
wherein the customer churn risk engine is configured to output the churn risk score by presenting a user interface that displays the churn risk score for the particular co-location facility customer,
wherein the customer churn risk engine is configured to receive user input via the user interface, the user input based on the churn risk score, and
wherein the customer churn risk engine is configured to send the message to the particular co-location facility customer in response to receiving the user input.

17. A non-transitory computer-readable storage medium encoded with instructions that, when executed, cause at least one processor of a computing device to:
query co-location data indicating co-location facility usage by a particular co-location facility customer and telemetry data indicating interconnections established between and enabling communications between the particular co-location facility customer and at least one additional co-location facility customer within at least one co-location facility operated by a co-location facility provider, wherein at least one of the co-location data and the telemetry data indicates, for the particular co-location facility customer, multi-factor data for one or more of a number of interconnections, power usage, or network usage by the particular co-location facility customer;
query data indicating prior interconnections of the particular co-location facility customer;
determine an interconnection trend for the particular co-location facility customer by comparing data indicating prior interconnections of the particular co-location facility customer with the telemetry data indicating interconnections established between and enabling communications between the particular co-location facility customer and at least one additional co-location facility customer within a plurality of co-location facilities operated by the co-location facility provider;
generate, based at least in part on the co-location data, the interconnection trend, and the telemetry data, a churn risk score for the particular co-location facility customer by applying a churn risk model that specifies respective weights for factors of the multi-factor data; and
output, for display to a display device, the churn risk score for the particular co-location facility customer;
generate a message to the particular co-location facility customer based on the churn risk score for the particular co-location facility customer; and
send the message to the particular co-location facility customer.

18. The non-transitory computer-readable storage medium of claim 17, wherein the co-location data comprises usage data indicating at least one of the power usage and the network usage by the particular co-location facility customer.

19. The non-transitory computer-readable storage medium of claim 17,
wherein the instructions to output the churn risk score comprise instructions to present a user interface that displays the churn risk score for the particular co-location facility customer,
wherein the non-transitory computer-readable storage medium is further encoded with instructions to receive user input via the user interface, the user input based on the churn risk score, and
wherein the instructions to send the message comprise instructions to send the message to the particular co-location facility customer in response to receiving the user input.

20. The non-transitory computer-readable storage medium of claim 17, wherein the non-transitory computer-readable storage medium is further encoded with instructions to:
apply at least one machine learning algorithm to data describing one or more co-location facility customers that have previously churned; and
use an output from the at least one machine learning algorithm to determine the respective weights for factors of the multi-factor data.

21. The non-transitory computer-readable storage medium of claim 17, wherein the churn risk model specifies a weight of the respective weights for the interconnection trend.

* * * * *